US008398881B2

(12) United States Patent
Tokiai

(10) Patent No.: US 8,398,881 B2
(45) Date of Patent: Mar. 19, 2013

(54) REFRIGERATING MACHINE OIL COMPOSITION

(75) Inventor: Takeo Tokiai, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 10/590,290

(22) PCT Filed: Mar. 29, 2005

(86) PCT No.: PCT/JP2005/005955
§ 371 (c)(1),
(2), (4) Date: Aug. 23, 2006

(87) PCT Pub. No.: WO2005/095557
PCT Pub. Date: Oct. 13, 2005

(65) Prior Publication Data
US 2007/0164252 A1 Jul. 19, 2007

(30) Foreign Application Priority Data
Apr. 2, 2004 (JP) ................. 2004-110507

(51) Int. Cl.
C09K 5/00 (2006.01)
C09K 5/04 (2006.01)
(52) U.S. Cl. .......................... 252/67; 252/68
(58) Field of Classification Search .............. 252/67, 252/68
See application file for complete search history.

(56) References Cited

U.S. PATENT DOCUMENTS

| | | | | |
|---|---|---|---|---|
| 5,403,503 A * | 4/1995 | Seiki et al. | | 508/440 |
| 5,449,472 A * | 9/1995 | Egawa et al. | | 252/68 |
| 5,454,963 A * | 10/1995 | Kaneko | | 508/304 |
| 5,518,643 A * | 5/1996 | Egawa et al. | | 252/68 |
| 5,801,132 A * | 9/1998 | Kaneko et al. | | 508/579 |
| 6,008,169 A * | 12/1999 | Kaneko | | 508/501 |
| 6,248,256 B1 * | 6/2001 | Nagao et al. | | 252/68 |
| 6,261,474 B1 * | 7/2001 | Egawa et al. | | 252/68 |
| 6,454,960 B1 * | 9/2002 | Sunaga et al. | | 252/67 |
| 6,478,983 B1 * | 11/2002 | Matsuura et al. | | 252/68 |
| 6,656,891 B1 * | 12/2003 | Sakanoue et al. | | 508/579 |
| 6,815,402 B2 * | 11/2004 | Tazaki et al. | | 508/422 |
| 2003/0158056 A1 * | 8/2003 | Ikeda | | 508/579 |

FOREIGN PATENT DOCUMENTS

| | | |
|---|---|---|
| CN | 1300316 A | 6/2001 |
| CN | 1096496 C | 12/2002 |
| EP | 2 322 592 A1 | 5/2011 |
| JP | 9 324187 | 12/1997 |
| JP | 10 147682 | 6/1998 |
| JP | 10 158671 | 6/1998 |
| JP | 11-181466 | 7/1999 |
| JP | 11-315295 | 11/1999 |
| JP | 11 323369 | 11/1999 |
| JP | 11 349970 | 12/1999 |
| JP | 2000 129275 | 5/2000 |
| JP | 2000 169867 | 6/2000 |
| JP | 2001 329289 | 11/2001 |
| JP | 2004 43611 | 2/2004 |
| KR | 10-2000-0057272 | 9/2000 |
| KR | 10-2003-0020406 | 3/2003 |
| KR | 10-2004-0007307 | 1/2004 |

OTHER PUBLICATIONS

Office Action issued Sep. 19, 2011, in Korean Patent Application No. 10-2006-7020311.

* cited by examiner

Primary Examiner — Peter F Godenschwager
Assistant Examiner — Jane L Stanley
(74) Attorney, Agent, or Firm — Oblon, Spivak, McClelland, Maier & Neustadt, L.L.P.

(57) ABSTRACT

The present invention provides a refrigerating oil composition containing a refrigerant (A) containing as a predominant component a C1-C8 hydrocarbon compound and a base oil (B) composed of a polyalkylene glycol ether having a specific structure and/or a polyvinyl ether having a specific structure, and satisfying the following conditions: solubility of the refrigerant (A) in the base oil (B) of 40 mass % or less at 40° C. and 1.2 MPa and mixture viscosity of the refrigerating oil composition of 0.1 $mm^2/s$ or more at 90° C. and 2.3 MPa. According to the refrigerating oil composition of the present invention, refrigerating oil and hydrocarbon-based refrigerant are mutually dissolved at an appropriate degree, and lubrication can be fully attained by the refrigerating oil. Even when the hydrocarbon-based refrigerant is used in an amount smaller than the conventional amount, cooling can be performed satisfactorily.

7 Claims, No Drawings

REFRIGERATING MACHINE OIL COMPOSITION

BACKGROUND OF THE INVENTION

1. Field of the Invention

The present invention relates to a refrigerating oil composition and more particularly, to a refrigerating oil composition which includes a refrigerant containing a hydrocarbon compound as a predominant component.

2. Background Art

In general, compression-type refrigerators includes a compressor, a condenser, an expansion valve, and an evaporator and have a structure in which a liquid mixture of a refrigerant and a lubricating oil is circulated in a closed system. In such compression-type refrigerators, generally, the inside temperature of the compressor rises to 50° C. or higher, and that of the condenser is at about −40° C., although these temperatures may vary depending on the model of the refrigerators. Therefore, a refrigerant and a lubricating oil are typically required to impart lubricity to movable members of the refrigerator and to be circulated in the refrigerator such that at least portions of the two liquids are in a mutually miscible state within a temperature range of −40° C. to +50° C.

Heretofore, chlorofluorocarbons such as dichlorofluoromethane (R-12) and chlorodifluoromethane (R-22) have been generally employed as a refrigerant for the compression-type refrigerators, and various types of mineral oils and synthetic oils have been employed as lubricating oils. However, since chlorofluorocarbons such as R-12 and R-22 may cause environmental pollution issue due to, for example, such as ozonosphere depletion, hydrogen-containing chlorofluoro compounds which are less destructive to ozonosphere, inter alia, 1,1,1,2-tetrafluoroethane (R-134a), has attracted attention in recent years.

However, these hydrogen-containing chlorofluoro compounds might aggravate global warming and, therefore, use of natural-substance-based cooling media that do not raise the above problems have been reevaluated. Among such cooling media, a hydrocarbon-based refrigerant is now under investigation.

In the case where a hydrocarbon-based refrigerant is used in a compression-type refrigerator, when a conventionally employed mineral oil or alkylbenzene is used as a lubricating oil, the base oil and the refrigerant are completely dissolved each other, thereby reducing viscosity of the base oil; i.e., reducing lubrication performance. As a result, wear resistance of members of the refrigerator and sealing performance are reduced, thereby causing, for example, difficulty in reliable operation for a long period of time.

Since the hydrocarbon-based refrigerant has flammability, reduction of the amount of the refrigerant added to a refrigerating system is investigated from the viewpoint of lowering influence of leakage thereof to the outside. The refrigerant dissolved in refrigerating oil provides decreased cooling effect. Thus, the refrigerant must be incorporated in a considerably large amount so as to compensate the portion of the refrigerant dissolved in lubricating oil. Therefore, reduction of such a large amount of refrigerant is a critical issue.

As described above, when a hydrocarbon-based refrigerant is used, a lubricating oil is required to have miscibility with respect to the refrigerant at such a degree that the lubricating oil can be circulated in the refrigerator and impart lubricity to movable members of the refrigerator. On the other hand, from the viewpoint of reduction of amount of a hydrocarbon-based refrigerant employed, the miscibility of the refrigerant is desired to be as small as possible.

In an attempt to solve the aforementioned problems, a variety of refrigerating oils including a hydrocarbon-based refrigerant have been proposed. For example, Japanese Patent Application Laid-Open (kokai) No. 11-349970 (in claims) discloses a refrigerating oil containing at least one member selected from a polyethylene glycol-based oil, a polypropylene glycol-based oil, a polyethylene glycol-polypropylene glycol copolymer-based oil, and polyvinyl ether-based oil.

Japanese Patent Application Laid-Open (kokai) No. 11-349970 discloses the aforementioned polyalkylene glycol oil and other materials in terms of molecular weight and end structures effective for use in combination of a hydrocarbon-based refrigerant. However, the patent document does not disclose mutual solubility of the hydrocarbon-based refrigerant and the lubricating oil in actual use in combination, mixture viscosity which serves as an index for the performance of the lubricating oil in which the refrigerant has been dissolved, and other properties. Therefore, the scope of the effective species among the disclosed polyalkylene glycol oil and other materials has not yet been confirmed.

Regarding polyalkylene glycol oil, the present applicant previously studied the relationship between the end structure of a polyethylene glycol (EO)-polypropylene glycol (PO) copolymer-based oil and the EO unit/PO unit ratio, and filed an application (see Japanese Patent Application Laid-Open (kokai) No. 10-158671, claims).

SUMMARY OF THE INVENTION

The present invention has been conceived with an aim to solve the aforementioned problems and is an improvement of the invention disclosed in Japanese Patent Application Laid-Open (kokai) No. 10-158671. Accordingly, an object of the present invention is to provide a refrigerating oil composition comprising a refrigerant containing as a predominant component a hydrocarbon-based refrigerant, wherein refrigerating oil and hydrocarbon-based refrigerant are mutually miscible at an appropriate degree, lubrication can be fully attained by the refrigerating oil, and even when the hydrocarbon-based refrigerant is used in an amount smaller than the conventional amount, cooling can be performed satisfactorily.

The present inventors have carried our extensive studies in order to attain the aforementioned object, and have found that the object can be attained through employment of a polyalkylene glycol ether and/or a polyvinyl ether each having a specific structure, thereby realizing appropriate miscibility with respect to a hydrocarbon-based refrigerant, and through control of the structure of the refrigerating oil so as to cause solubility of the refrigerant in a base oil and mixture viscosity of the refrigerating oil composition composed of the base oil and the refrigerant to fall within specific ranges. The present invention has been accomplished on the basis of this finding.

Accordingly, the present invention provides a refrigerating oil composition described below.

1. A refrigerating oil composition comprising a refrigerant (A) containing as a predominant component a C1-C8 hydrocarbon compound and a base oil (B) composed of a polyalkylene glycol ether represented by formula (I):

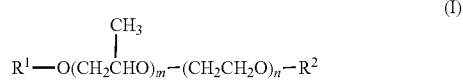

wherein each of $R^1$ and $R^2$ represents a hydrogen atom, a C1-C18 hydrocarbon group, or a C2-C18 acyl group, provided that $R^1$ and $R^2$ are not simultaneously hydrogen atoms; each of m and n is an integer of 1 or more; and n/(m+n) is more than 0.4, and/or a polyvinyl ether represented by formula (II):

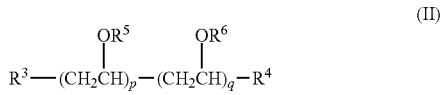
(II)

wherein each of $R^3$ and $R^4$ represents a hydrogen atom, a C1-C18 hydrocarbon group, or a C2-C18 acyl group; $R^5$ represents a C1-C4 hydrocarbon group; $R^6$ represents a C2-C4 hydrocarbon group, provided that the number of carbon atoms contained in $R^6$ is greater than that of carbon atoms contained in $R^5$; p is an integer of 1 or more; and q is an integer of 0 or more, and satisfying the following conditions:

(i) solubility of the refrigerant (A) in the base oil (B) is 40 mass % or less at 40° C. and 1.2 MPa and (ii) mixture viscosity of the refrigerating oil composition is 0.1 mm²/s or more at 90° C. and 2.3 MPa.

2. A refrigerating oil composition as described in above 1, wherein p/(p+q) in formula (II) is 0.1 or more.

3. A refrigerating oil composition as described in above 2, wherein $R^5$ in formula (II) is a methyl group.

4. A refrigerating oil composition as described in any one of above 1 to 3, wherein the solubility of the refrigerant (A) in the base oil (B) is 2 to 40 mass % at 40° C. and 1.2 MPa.

5. A refrigerating oil composition as described in above 4, wherein the solubility of the refrigerant (A) in the base oil (B) is 2 to 30 mass % at 40° C. and 1.2 MPa.

6. A refrigerating oil composition as described in above 5, wherein the solubility of the refrigerant (A) in the base oil (B) is 5 to 25 mass % at 40° C. and 1.2 MPa.

7. A refrigerating oil composition as described in any one of above 1 to 6, which exhibits a mixture viscosity of 0.5 mm²/S or more at 90° C. and 2.3 MPa.

8. A refrigerating oil composition as described in any one of above 1 to 7, wherein the base oil (B) has a weight average molecular weight (Mw) of 500 or more.

9. A refrigerating oil composition as described in any one of above 1 to 8, wherein the base oil (B) has an oxygen atom content of 10 mass % or more.

According to the refrigerating oil composition of the present invention, refrigerating oil and hydrocarbon-based refrigerant are mutually miscible at an appropriate degree, and lubrication can be fully attained by the refrigerating oil. In addition, even when the hydrocarbon-based refrigerant is used in an amount smaller than the conventional amount, cooling can be performed satisfactorily.

DETAILED DESCRIPTION OF PREFERRED EMBODIMENTS

The refrigerating oil composition of the present invention contains a refrigerant (A) containing as a predominant component a C1-C8 hydrocarbon compound. The hydrocarbon compound, serving as a predominant component of the component (refrigerant) (A) employed in the present invention, has 1 to 8 carbon atoms, preferably 1 to 5 carbon atoms, more preferably 3 to 5 carbon atoms. When the number of carbon atoms is 9 or more, the hydrocarbon compound has excessively high boiling point, which is not preferred to serve as a refrigerant. Examples of the hydrocarbon compound employed in the present invention include methane, ethane, ethylene, propane, cyclopropane, propylene, n-butane, isobutane, n-pentane, and isopentane.

These hydrocarbon compounds may be used singly or in combination of two or more species. The refrigerant may be formed exclusively of a hydrocarbon compound(s). Alternatively, a mixture of the hydrocarbon compound with another refrigerant such as a hydrofluorocarbon (e.g., R-134a), ether, or $CO_2$ may also be used.

As used herein, the term "predominant component" refers to a component having a content of 50 mass % or more.

The refrigerating oil composition of the present invention contains, as a base oil (B), a polyalkylene glycol ether represented by formula (I):

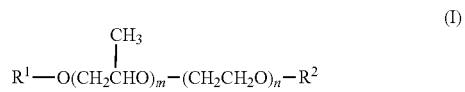
(I)

and/or a polyvinyl ether represented by formula (II).

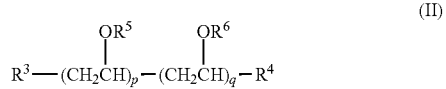
(II)

In formula (I), each of $R^1$ and $R^2$ represents a hydrogen atom, a C1-C18 hydrocarbon group, or a C2-C18 acyl group. $R^1$ and $R^2$ may be identical to or different from each other, provided that $R^1$ and $R^2$ are not simultaneously hydrogen atoms. When $R^1$ and $R^2$ are simultaneously hydrogen atoms, lubricity and stability are disadvantageously poor.

The C1-C18 hydrocarbon group and the C2-C18 acyl group represented by $R^1$ or $R^2$ in formula (I) may be any form of linear chain, branched chain, and cyclic. Specific examples of the hydrocarbon group include alkyl groups such as a methyl group, an ethyl group, an n-propyl group, an i-propyl group, an n-butyl group, an i-butyl group, a sec-butyl group, a tert-butyl group, pentyl groups, hexyl groups, heptyl groups, octyl groups, nonyl groups, decyl groups, undecyl groups, dodecyl groups, tridecyl groups, tetradecyl groups, pentadecyl groups, hexadecyl groups, and octadecyl groups; cycloalkyl groups such as a cyclopentyl group, a cyclohexyl group, a methylcyclohexyl group, an ethylcyclohexyl group, and a dimethylcyclohexyl group; and aromatic groups such as a phenyl group, a methylphenyl group, an ethylphenyl group, a dimethylphenyl group, a benzyl group, and methylbenzyl groups. Examples of the C2-C18 acyl group include an acetyl group, a propionyl group, a butyryl group, a valeryl group, and a benzoyl group.

When the number of carbon atoms in the hydrocarbon group or the acyl group exceeds 18, miscibility with respect to hydrocarbon serving as a refrigerant excessively increases, whereby hydrocarbon is completely dissolved in the base oil at an arbitrary. From the viewpoint, in formula (I), each of $R^1$ and $R^2$ is most preferably a C1-C6 alkyl group.

Requirements regarding the mole fractions of PO and EO, which are repeating units of formula (I), include that each of m (number of repetition of PO) and n (number of repetition of EO) is an integer of 1 or more, and that n/(m+n) exceeds 0.4. When requirements are satisfied, an appropriate miscibility with a hydrocarbon refrigerant is assured. PO and EO may be bonded in a block manner or a random manner, so long as the aforementioned relationship between m and n is satisfied.

In the refrigerating oil composition of the present invention, polyalkylene glycol ether compounds represented by formula (I) may be used in the base oil singly or in combination of two or more species.

In formula (II), each of $R^3$ and $R^4$ represents a hydrogen atom, a C1-C18 hydrocarbon group, or a C2-C18 acyl group. $R^3$ and $R^4$ may be identical to or different from each other. Preferably, $R^3$ and $R^4$ are simultaneously hydrogen atoms.

The C1-C18 hydrocarbon group and the C2-C18 acyl group represented by $R^3$ or $R^4$ in formula (II) may be any form of linear chain, branched chain, and cyclic. Specific examples of the C1-C18 hydrocarbon group and the C2-C18 acyl group include the same members as listed in relation to $R^1$ and $R^2$. When the number of carbon atoms in the hydrocarbon group or the acyl group exceeds 18, miscibility with respect to hydrocarbon serving as a refrigerant excessively increases, whereby hydrocarbon is completely dissolved in the base oil at an arbitrary. Among these hydrocarbon groups and acyl groups, C1-C6 alkyl groups are preferred.

$R^5$ represents a C1-C4 hydrocarbon group, and $R^6$ represents a C2-C4 hydrocarbon group. The number of carbon atoms contained in $R^6$ is greater than that of carbon atoms contained in $R^5$. $R^5$ and $R^6$ may take various combinations. For example, when $R^5$ is a methyl group, $R^6$ is an ethyl group, an n-propyl group, an isopropyl group, or any of butyl groups. In particular, the combination of methyl ($R^5$) and ethyl ($R^6$) is most preferred.

Regarding the number (p) of repetition of a repeating unit having $R^5$ as a side-chain group and the number (q) of repetition of a repeating unit having $R^6$ as a side-chain group, p is an integer of 1 or more, and q is 0 or an integer of 1 or more. The ratio p/(p+q) is preferably 0.1 or more.

Preferably, $R^5$ is a methyl group, $R^6$ is a C2-C4 hydrocarbon group, and the ratio p/(p+q) is 0.1 or more. When the requirements are satisfied, an appropriate miscibility with a hydrocarbon refrigerant is assured. From the viewpoint, more preferably, the ratio p/(p+q) is 0.5 or more in the case in which $R^5$ is a methyl group and $R^6$ is a C2-C4 hydrocarbon group. The repeating unit having $R^5$ as a side-chain group and the repeating unit having $R^6$ as a side-chain group may be bonded in a random manner or a block manner.

In the refrigerating oil composition of the present invention, polyvinyl ether compounds represented by formula (II) may be used in the base oil singly or in combination of two or more species.

The base oil (B) of the refrigerating oil composition of the present invention may be a mixture of the polyalkylene glycol ether represented by formula (I) and the polyvinyl ether represented by formula (II).

In the present invention, the base oil, component (B), preferably has a weight average molecular weight (Mw) of 500 or more. When the weight average molecular weight of 500 or more, sufficient viscosity required for attaining lubricity can be obtained. Thus, the molecular weight is preferably 700 or more. On the other hand, in consideration of viscosity resistance at low temperature, the weight average molecular weight is preferably 5,000 or less.

In the present invention, the base oil, component (B), preferably has a kinematic viscosity at 100° C. of 2 to 200 mm²/s. When the kinematic viscosity is 2 mm²/s or more, satisfactory sealing performance is attained, and satisfactory lubrication performance is assured. When the kinematic viscosity is 200 mm²/S or less, viscosity resistance at low temperature does not excessively increase, and therefore, stop of operation and other maloperation which would otherwise be caused by increase in torque can be prevented. From the viewpoint, the kinematic viscosity at 100° C. more preferably falls within a range of 5 to 100 mm²/S.

In the present invention, the base oil, component (B), preferably has an oxygen atom content of 10 mass % or more. When the base oil has a oxygen content over a certain level, the base oil (B) is imparted with polarity, and miscibility with respect to the hydrocarbon-based refrigerant (A) is controlled. When the oxygen atom content of the base oil (B) is 10 mass % or more, the below-mentioned solubility of the refrigerant (A) in the base oil (B) can be controlled so as to fall within a preferred range. No particular limitation is imposed on the upper limit of the oxygen atom content of the base oil, so long as the solubility falls within the below-mentioned range. However, in consideration of appropriate miscibility of the refrigerating oil with the hydrocarbon refrigerant, the oxygen atom content of the base oil is preferably 30 mass % or less.

In the refrigerating oil composition of the present invention, the amount of the hydrocarbon refrigerant (A) employed and the amount of the base oil (B) employed preferably have a relationship represented by a ratio by mass, component (A)/component (B), falling within a range of 10/90 to 99/1. When the ratio, component (A)/component (B), is 10/90 or more, sufficient freezing performance can be attained, and also when the ratio, component (A)/component (B), is 99/1 or less, sufficient lubricating performance can be attained. From the viewpoint, the aforementioned ratio by mass, component (A)/component (B), more preferably falls within a range of 95/5 to 30/70.

The refrigerating oil composition of the present invention essentially exhibits a solubility of the refrigerant (A) in the base oil (B) of 40 mass % or less at 40° C. and 1.2 MPa. When the solubility is in excess of 40 mass %, the absolute amount of the refrigerant required for freezing must be increased, which is disadvantageous.

No particular limitation is imposed on the lower limit of the solubility of the refrigerant, so long as sufficient lubricity can be obtained in the refrigerator. However, in general, the solubility is preferably 2 mass % or more. Thus, in consideration of both the refrigerant content and lubricating performance, the solubility of the refrigerant (A) in the base oil (B) at 40° C. and 1.2 MPa is preferably 2 to 40 mass %. From a similar viewpoint, the solubility is more preferably 30 mass % or less, most preferably 5 to 25 mass %.

The refrigerating oil composition of the present invention essentially exhibits a mixture viscosity is 0.1 mm²/S or more at 90° C. and 2.3 MPa. When the mixture viscosity is 0.1 mm²/S or more, the composition is sufficiently circulated in the refrigerator and imparts lubricity to movable members of the refrigerator. From the viewpoint, the mixture viscosity at 90° C. and 2.3 MPa is preferably 0.5 mm²/s or more. The mixture viscosity is preferably 20 mm²/s (upper limit) or less in consideration of viscosity resistance at low temperature.

In the refrigerating oil composition of the present invention, the hydrocarbon-based refrigerant (A) and the base oil (B) are appropriately miscible with each other. When the ratio by mass, component (A)/component (B), is 5/95 to 95/5 (oil content: 5 to 95%), the hydrocarbon-based refrigerant (A) and the base oil (B) are preferably separated to form two layers within a temperature range of −50° C. to +50° C.

Into the refrigerating oil composition of the present invention, a variety of known additives may be appropriately incorporated in accordance with needs. Examples of the additives include an extreme pressure agent such as a phosphoric ester (e.g., tricresyl phosphate (TCP) or a phosphorous ester (e.g., trisnonylphenyl phosphite); a phenol-based antioxidant and an amine-based antioxidant; a stabilizer such as phenyl glycidyl ether, cyclohexene oxide, or epoxidized soybean oil; a copper-inactivating agent such as benzotriazole or a derivative thereof; an antifoaming agent such as silicone oil and fluorosilicone oil. If required, an anti-load additive, a chlorine-scavenger, a detergent-dispersant, a viscosity index improver, an oily additive, an anti-corrosive, a corrosion inhibitor, a pour point depressant, etc. may also be added. Generally, these additives are incorporated into refrigerating oil composition of the present invention in amounts of 0.5 to 10 mass %.

The refrigerating oil composition of the present invention may be used in a variety of refrigerators. In particular, the composition is preferably applied to a compression-type freezing cycle in a compression-type refrigerator, for example, a general compression-type freezing cycle including a compressor, a condenser, an expansion valve, and an evaporator.

EXAMPLES

The present invention next will be described in more detail by way of Examples and Comparative Examples, which should not be construed as limiting the invention thereto.
(Measurement and Evaluation of Physical Properties)
(1) Kinematic Viscosity
  Kinematic viscosity was measured in accordance with JIS K2283-1983 at 40° C. and 100° C. by means of a glass capillary viscometer.
(2) Density
  Density was measured in accordance with JIS K 2249.
(3) Weight-Average Molecular Weight
  Weight-average molecular weight was measured through gel permeation chromatography (GPC) by means of a chromatograph ("CO-2055," product of JASCO) equipped with a linked column ("LF404" and "KF606M," products of JASCO).
(4) Oxygen Atom Content
  Oxygen atom content was determined by subtracting, from the total amount of each sample, amounts of carbon (C), hydrogen (H), and nitrogen (N) measured through element analysis.
(5) Solubility of Refrigerant
  Predetermined amounts of a sample oil and a refrigerant were placed in a sealable glass pressure container, and the mixture was heated from room temperature to about 120° C. Volume of the sample oil in which the refrigerant was dissolved and pressure were monitored, whereby a temperature/pressure/solubility curve was obtained through calculation. From the solubility curve, solubility (mass %) of the refrigerant in the sample oil was determined at 40° C. and at 1.2 MPa.
(6) Two-Layer Separation Temperature
  The miscibility of a refrigerant to a sample oil was determined as follows. A sample oil and a refrigerant were fed into a glass pressure container so that the sample oil was contained in an amount of 3 mass %, and the container was placed in a thermostat. The mixture was gradually cooled from room temperature to −50° C., and the temperature at which phase separation started was measured by means of an optical sensor. Similarly, the mixture was heated from room temperature to +50° C., and the temperature at which phase separation started was measured by means of an optical sensor.
(7) Mixture Viscosity
  Predetermined amounts of a sample oil and a refrigerant were placed in a glass pressure container, and mixture viscosity of the mixture was determined at 2.3 MPa and 90° C. by means of a viscometer.
(8) Lubricity Test
  A refrigerant (10 g) and a sample oil (40 g) were mixed to prepare a test sample. The lubricating performance of the sample was tested by means of a closed-type block-on-ring test machine under the conditions: 60 minutes, room temperature, a load of 100 kgf, and 100 rpm, to thereby measure scar width.

Production Example 1 (Polyalkylene Glycol Ether)

In a 200-mL stainless steel autoclave equipped with a stirrer and a liquid inlet tube, powdery sodium methoxide (3.0 g, 0.056 mol) was placed and heated to 105° C. Propylene oxide (100 g) was fed thereto with pressure through the liquid inlet tube under stirring over ten hours. The autoclave was cooled to room temperature. Subsequently, while the autoclave was cooled with ice-water, methyl iodide (19 g, 0.13 mol) was added to the mixture. Under stirring, the autoclave was gradually heated to 90° C., and the mixture was caused to react for four hours at 90° C. After the reaction mixture was transferred to a 300-mL glass flask, toluene was removed with heat under reduced pressure, and sodium iodide precipitated was removed through centrifugation. Water (100 mL) and methanol (200 mL) were added to the liquid, and the resultant solution was caused to pass sequentially through a column filled with a cation exchange resin (200 mL) and a column filled with an anion exchange resin (200 mL). The solvent was removed, and the residue was heated for one hour at 100° C. under reduced pressure (13.3 Pa (0.1 mmHg)) attained by a vacuum pump, to thereby yield 93 g of a target compound, polyoxypropylene glycol dimethyl ether, (average molecular weight: 870).

Production Examples 2 and 3 (Polyalkylene Glycol Ethers)

The procedure of Production Example 1 was repeated, except that each of the propylene oxide-ethylene oxide mixtures shown in Table 1 was employed instead of propylene oxide (100 g), to thereby prepare polyalkylene glycol ethers. The structure and physical properties of the refrigerating oils prepared in Production Examples are shown in Table 1.

TABLE 1

|  |  | Pro. Ex. 1 | Pro. Ex. 2 | Pro. Ex. 3 |
|---|---|---|---|---|
| Starting | Ethylene oxide | 0 | 40 | 70 |
| material (g) | Propylene oxide | 100 | 60 | 30 |
| n/(m + n) |  | 0 | 0.4 | 0.7 |
| Kinematic | 40° C. | 44.0 | 47.8 | 73.1 |
| viscosity (mm$^2$/s) | 100° C. | 9.6 | 10.9 | 16.0 |
| Viscosity index |  | 211 | 227 | 234 |
| Density(15° C.) (g/cm$^3$) |  | 0.994 | 1.031 | 1.074 |
| Weight-average molecular weight |  | 870 | 1,090 | 1,360 |
| Oxygen atom content (mass %) |  | 36 | 32 | 30 |

Production Example 4 (Polyvinyl Ether)

Polyvinyl ether was prepared in accordance with a method described in Japanese Patent Application Laid-Open (kokai) No. 6-128184, Example 3.
(1) Preparation of Catalyst
(1-1) Catalyst Preparation Example 1
  Raney nickel (hydrous) (trade name "M300T," product of Kawaken Fine Chemicals co., Ltd.) (100 g) was fed into a flask, and anhydrous ethanol (100 g) was added thereto, followed by thoroughly mixing. The mixture was left to stand for precipitation of Raney nickel, and the supernatant was removed through decantation. Raney nickel collected in the flask was further subjected to the above procedure five times.

(1-2) Catalyst Preparation Example 2

Zeolite (trade name "HSZ330HUA," product of Tosoh Corporation) (20 g) was placed in a 100-mL egg-plant type flask, and the flask was placed in an oil bath at 150° C. and evacuated for one hour by means of an oil-sealed rotary vacuum pump. The temperature was lowered to room temperature, and, thereafter, the pressure was returned to normal pressure through use of dry nitrogen.

(2) Preparation of Starting Material

Toluene (1,000 g), acetaldehyde diethyl acetal (500 g), and boron fluoride ethyl etherate (5.0 g) were added to a 5-L glass flask equipped with a dropping funnel, a condenser, and a stirrer. Ethyl vinyl ether (2,500 g) was added dropwise thereto through the dropping funnel over 2.5 hours, while the temperature of the mixture was maintained at about 25° C. by cooling in an ice-water bath. After completion of addition, the mixture was stirred for five minutes, and the reaction mixture was transferred to a washing tank and washed three times with 5% aqueous sodium hydroxide (1,000 mL) and then three times with water (1,000 mL). The solvent and residual starting materials were removed under reduced pressure through use of a rotary evaporator, thereby yielding 2,833 g of a reaction product. The reaction product was found to include compounds represented by formulas (III) and (IV), respectively. The mole ratio (III):(IV) was found to be 5:5, and the average of n was found to be 5.6.

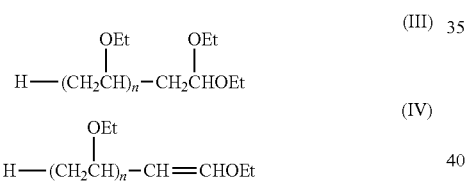

(3) To a 1-L autoclave made of SUS-316L, the oligomer (200 g) prepared in (2) above, Raney nickel (6.0 g, in a wet state with ethanol) prepared in Catalyst Preparation Example 1, and zeolite (6.0 g) prepared in Catalyst Preparation Example 2 were added. Hydrogen was fed to the autoclave so as to attain a hydrogen pressure of 981 kPa (10 kg/cm$^2$), and the mixture was stirred for about 30 seconds, followed by depressurizing. Again, hydrogen was fed to the autoclave so as to adjust the hydrogen pressure to 981 kPa (10 kg/cm$^2$), and the mixture was stirred for about 30 seconds, followed by depressurizing. Further, the same hydrogen treatment under pressurized conditions was performed again. Subsequently, hydrogen pressure in the autoclave was adjusted to 2,452 kPa (25 kg/cm$^2$), and temperature was elevated to 140° C. over 30 minutes under stirring, and the mixture was allowed to react at 140° C. for two hours. During temperature elevation and reaction, drop in hydrogen pressure caused by reaction was observed. When hydrogen pressure increased due to temperature elevation, appropriate depressurization is effected, whereas when hydrogen pressure decreased in the course of reaction, appropriate pressurization is effected, thereby maintaining a hydrogen pressure of 2,452 kPa (25 kg/cm$^2$). After completion of reaction, the temperature was lowered to room temperature, and, subsequently, the pressure was returned to normal pressure. Hexane (100 mL) was added to the reaction mixture, and the resultant mixture was left to stand for 30 minutes to precipitate the catalysts. The reaction mixture was subjected to decantation. The hexane solution containing the reaction mixture was filtered through use of a paper filter. The filtrate was processed by means of a rotary evaporator to thereby remove hexane, water, and other components, to thereby yield 162 g of a reaction product. The starting acetal was found to be converted to an ether compound represented by formula (V) (wherein Et represents an ethyl group) (conversion: 100%). Also, the ethyl vinyl ether oligomer represented by formula (IV) was found to be converted to an ether compound represented by the formula (V): i.e., a polyvinyl ether (hereinafter referred to as "PVE") represented by formula (II), wherein each of R$^3$ and R$^4$ is a hydrogen atom, R$^5$ is an ethyl group, p is 20 (in average), and q is 0.

Production Examples 5 to 7 (Polyvinyl Ethers)

The procedure of Production Example 4 was repeated, except that each of the mixtures of ethyl vinyl ether and methyl vinyl ether (compositional proportions by mass of the mixtures are shown in Table 2) was employed instead of ethyl vinyl ether, to thereby prepare PVEs. Each of the PVEs has a structure represented by formula (VI), wherein Me represents a methyl group, and p and q have a relationship shown in Table 2. The physical properties of each PVE are also shown in Table 2.

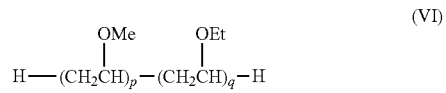

TABLE 2

| | | Pro. Ex. 4 | Pro. Ex. 5 | Pro. Ex. 6 | Pro. Ex. 7 |
|---|---|---|---|---|---|
| Starting material (g) | methyl vinyl ether | 0 | 90 | 88 | 98 |
| | ethyl vinyl ether | 100 | 10 | 12 | 2 |
| p/(p + q) | | 0 | 0.90 | 0.88 | 0.98 |
| Kinematic viscosity (mm$^2$/s) | 40° C. | 325.2 | 155.2 | 62.7 | 313.7 |
| | 100° C. | 23.2 | 14.4 | 7.8 | 20.7 |
| Viscosity index | | 89 | 90 | 85 | 75 |
| Weight-average molecular weight | | 1,700 | 900 | 500 | 1,500 |
| Oxygen atom content (mass %) | | 25 | 27 | 26 | 27 |

Example 1

The polyalkylene glycol ether (hereinafter referred to as "PAG") prepared in Production Example 3 and a hydrocarbon-based refrigerant ("CARE40," product of Koike Kagaku, propane (97.8 mass %), ethane (0.5 mass %), iso-butane (1.2 mass %), and n-butane (0.5 mass %)) were used as a base oil and a refrigerant, respectively, and solubility of the refrigerant in the base oil and two-layer separation temperature were determined. Separately, PAG (50 g) and the hydrocarbon-based refrigerant (100 g) were mixed together, to thereby prepare a refrigerating oil composition. The lubricity of the composition was determined through the above-described method. The results are shown in Table 3.

Comparative Example 1

The procedure of Example 1 was repeated, except that a mineral oil ("Suniso 4GSD," product of Japan Sun Oil Co., Ltd.) was employed as a base oil, to thereby determine solubility of the refrigerant in the base oil, two-layer separation temperature, and lubricity. The results are shown in Table 3.

Comparative Example 2

As shown in Table 3, the procedure of Example 1 was repeated, except that PAG prepared in Production Example 1 was employed as a base oil, to thereby determine solubility of the refrigerant in the base oil, two-layer separation temperature, and lubricity. The results are shown in Table 3.

Example 2

As shown in Table 3, the procedure of Example 1 was repeated, except that PAG prepared in Production Example 2 was employed as a base oil, to thereby determine solubility of the refrigerant in the base oil, two-layer separation temperature, and lubricity. The results are shown in Table 3.

According to the refrigerating oil composition of the present invention, refrigerating oil and hydrocarbon-based refrigerant are mutually miscible at an appropriate degree, and lubrication can be fully attained by the refrigerating oil. Even when the hydrocarbon-based refrigerant is used in an amount smaller than the conventional amount, cooling can be performed satisfactorily. In addition, the refrigerating oil composition of the present invention may be used in a variety of refrigerators. In particular, the composition is preferably applied to a compression-type freezing cycle in a compression-type refrigerator.

What is claimed is:

1. A refrigerating oil composition, comprising:
   a refrigerant (A) comprising as a predominant component propane; and
   a base oil (B) comprising a polyvinyl ether represented by formula (II):

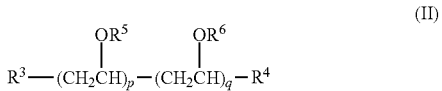

wherein each of $R^3$ and $R^4$ represents a hydrogen atom, a C1-C18 hydrocarbon group, or a C2-C18 acyl group; $R^5$ represents a methyl group; $R^6$ represents an ethyl group; p is an integer of 1 or more; and q is an integer of 1 or more and wherein $p/(p+q)$ in formula (II) is 0.5 or more;

TABLE 3

| | Base oil | Solubility of refrigerant (mass %) | Two-layer separation temp. High temp. side (° C.) | Two-layer separation temp. Low temp. side (° C.) | Mixture viscosity (mm²/s) | Scar width (mm) |
|---|---|---|---|---|---|---|
| Ex. 1 | PAG of Pro. Ex. 3 | 9 | Separated to two layers at −50° C. to 50° C. | | 7.0 | 0.74 |
| Comp. Ex. 1 | Mineral oil | 53 | ≧50° C. | ≦−50° C. | 5.0 | 1.21 |
| Comp. Ex. 2 | PAG of Pro. Ex. 1 | 32 | ≧50° C. | ≦−50° C. | 2.6 | 1.11 |
| Ex. 2 | PAG of Pro. Ex. 2 | 16 | Separated to two layers at −50° C. to 50° C. | | 2.9 | 1.05 |

Examples 3 to 5 and Comparative Example 3

As shown in Table 4, the procedure of Example 1 was repeated, except that each of PVEs prepared in Production Examples 4 to 7 was employed as a base oil, to thereby determine solubility of the refrigerant in the base oil, two-layer separation temperature, and lubricity. The results are shown in Table 4.

wherein the composition satisfies the following conditions:
(i) solubility of the refrigerant (A) in the base oil (B) is 40 mass % or less at 40° C. and 1.2 MPa; and
(ii) mixture viscosity of the refrigerating oil composition is 0.1 mm²/s or more at 90° C. and 2.3 MPa.

2. A refrigerating oil composition as described in claim 1, wherein the solubility of the refrigerant (A) in the base oil (B) is 2 to 40 mass % at 40° C. and 1.2 MPa.

TABLE 4

| | Base oil | Solubility of refrigerant (mass %) | Two-layer separation temp. High temp. side (° C.) | Two-layer separation temp. Low temp. side (° C.) | Mixture viscosity (mm²/s) | Scar width (mm) |
|---|---|---|---|---|---|---|
| Ex. 3 | PVE of Pro. Ex. 5 | 37.5 | Separated to two layers at −50° C. to 50° C. | | 6.5 | 0.64 |
| Ex. 4 | PVE of Pro. Ex. 6 | 36 | Separated to two layers at −50° C. to 50° C. | | 4.0 | 0.91 |
| Ex. 5 | PVE of Pro. Ex. 7 | 32 | Separated to two layers at −50° C. to 50° C. | | 6.5 | 0.62 |
| Comp. Ex. 3 | PVE of Pro. Ex. 4 | 48.5 | ≧50° C. | −≦50° C. | 7.0 | 0.77 |

3. A refrigerating oil composition as described in claim 2, wherein the solubility of the refrigerant (A) in the base oil (B) is 2 to 30 mass % at 40° C. and 1.2 MPa.

4. A refrigerating oil composition as described in claim 3, wherein the solubility of the refrigerant (A) in the base oil (B) is 5 to 25 mass % at 40° C. and 1.2 MPa.

5. A refrigerating oil composition as described in claim 1, which exhibits a mixture viscosity of 0.5 mm$^2$/s or more at 90° C. and 2.3 MPa.

6. A refrigerating oil composition as described in claim 1, wherein the base oil (B) has a weight average molecular weight (Mw) of 500 or more.

7. A refrigerating oil composition as described in claim 1, wherein the base oil (B) has an oxygen atom content of 10 mass % or more.

* * * * *